(12) United States Patent
Tabata et al.

(10) Patent No.: US 6,499,829 B1
(45) Date of Patent: Dec. 31, 2002

(54) COLOR IMAGE FORMING APPARATUS

(75) Inventors: Sunao Tabata, Yokohama (JP); Takayuki Sawada, Tokyo (JP); Hiroki Kanno, Yokohama (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/651,283

(22) Filed: Aug. 30, 2000

(30) Foreign Application Priority Data

Aug. 31, 1999 (JP) ............................................ 11-246232

(51) Int. Cl.$^7$ .................................................. B41J 2/21
(52) U.S. Cl. ............................... 347/43; 359/1.9; 347/15
(58) Field of Search ................................ 347/15, 43, 5; 358/1.9, 298, 1.16, 501

(56) References Cited

U.S. PATENT DOCUMENTS

| | | | |
|---|---|---|---|
| 6,231,149 B1 | * 5/2001 | Matsumoto | 358/1.16 |
| 6,234,600 B1 | * 5/2001 | Danzuka et al. | 347/15 |
| 6,250,733 B1 | * 6/2001 | Yao et al. | 347/43 |

OTHER PUBLICATIONS

Shinji Kita, "Logical Algorithm of Black Ink Printing.", The fifth Chromatic engineering conference, pp. 59–62, 1988.

* cited by examiner

*Primary Examiner*—Lamson Nguyen
(74) *Attorney, Agent, or Firm*—Foley & Lardner

(57) ABSTRACT

A color image processing device is disclosed which has an increased degree of freedom in black-coloring processing and permits color images which have good color reproducibility and are less susceptible to position displacement in black-colored portions to be output. The device includes a minimum detector circuit, a first lookup table for determining the amount of black material (K), a second lookup table for determining the amount of black material ($k_1$) in color materials which has one of 256 values from 0 to 255, a third lookup table for determining the amount by which the underlying color is removed ($k_2$) which has one of 256 values from 0 to 255, and three subtracters and three dividers for processing the outputs of the lookup tables to calculate C', M' and Y' indicating the amounts of color materials used in the printer. The amount of black material and the amount of black material mixed with each of C, M and Y are controlled according to the relations:

$K = \alpha \times \min(C, M, Y)$ $C' = (C-k_1)/(255-k_2)$ $M' = (M-k_1)/(255-k_2)$ and $Y' = (Y-k_1)/(255-k_2)$ where $\alpha$ is a black rate of up to 100%.

13 Claims, 12 Drawing Sheets

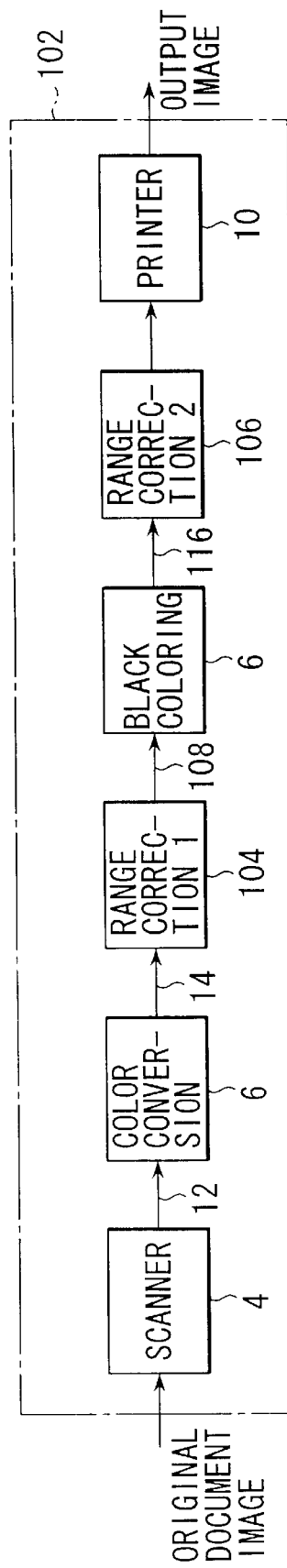

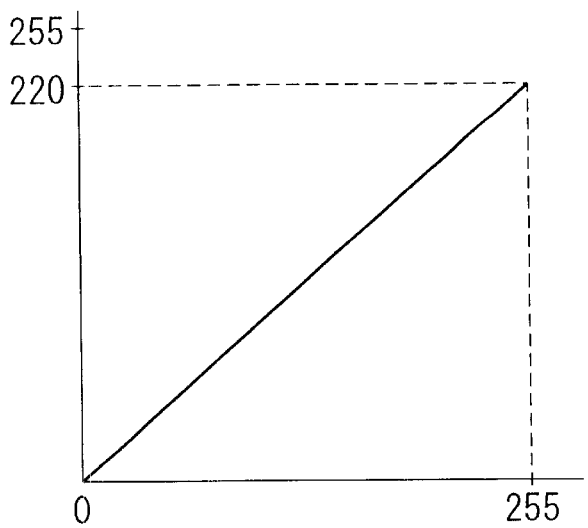
FIG. 5
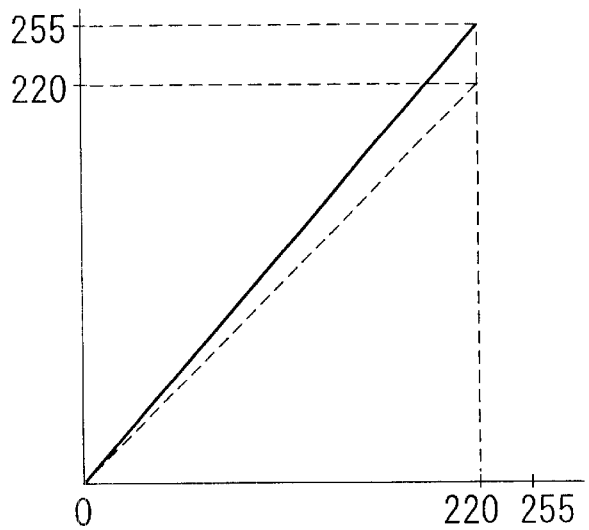
FIG. 6
| ADDRESS | OUTPUT SIGNAL |
|---|---|
| 220 | 220 |
| 219 | 219 |
| 218 | 218 |
| ⋮ | |
LUT (1)
FIG. 8A
| ADDRESS | OUTPUT SIGNAL |
|---|---|
| 220 | 150 |
| 219 | 149 |
| 218 | 148 |
| ⋮ | |
LUT (2)
FIG. 8B

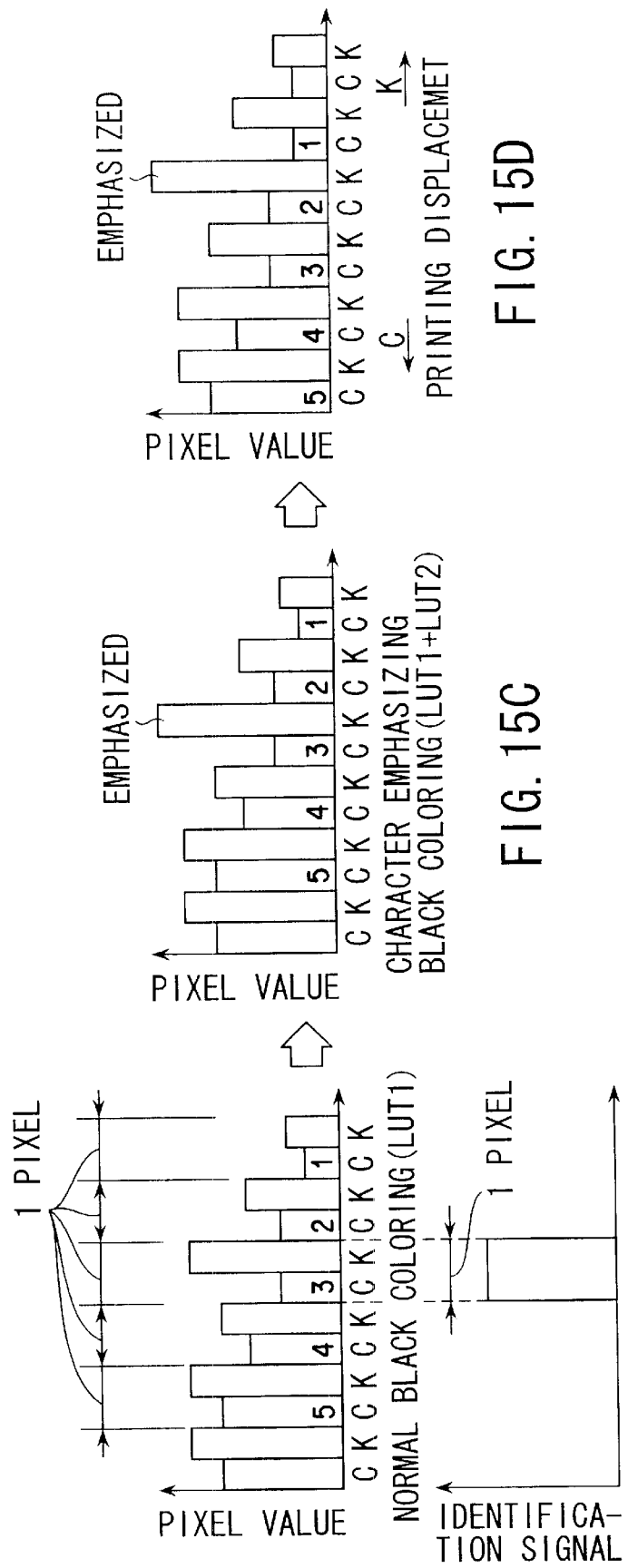

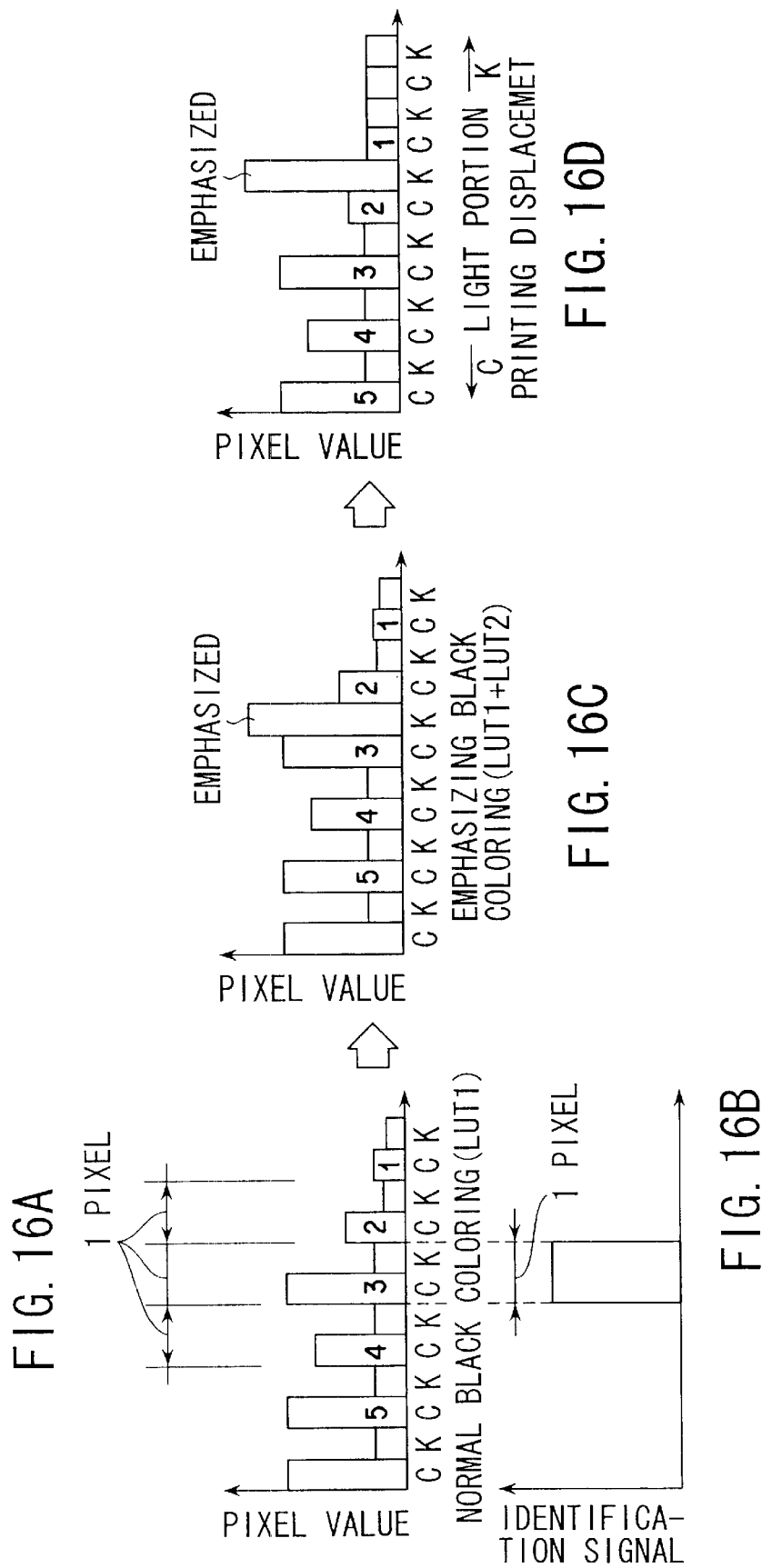

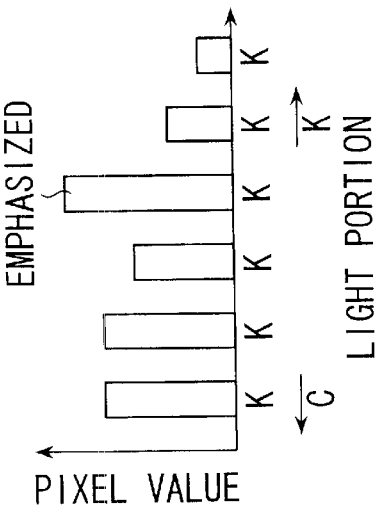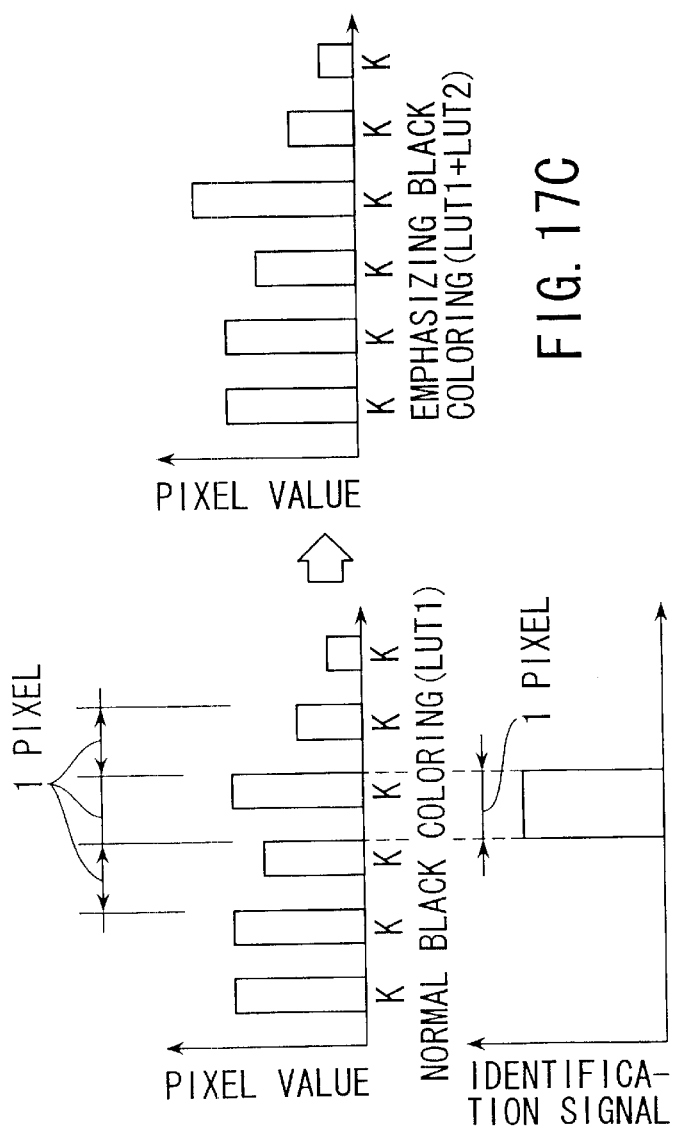

COLOR IMAGE FORMING APPARATUS

CROSS-REFERENCE TO RELATED APPLICATIONS

This application is based upon and claims the benefit of priority from the prior Japanese Patent Application No. 11-246232, filed Aug. 31, 1999, the entire contents of which are incorporated herein by reference.

BACKGROUND OF THE INVENTION

The present invention relates to a color image processing device adaptable to an image forming apparatus for forming the image of an object onto a transferred material.

In the field of color printing and color copying (including printouts by printers), a method has been widely used which forms color images by using black (K) in addition to three primary colors of cyan (C), magenta (M) and yellow (Y) (chromatic colors) in the subtractive primaries of color mixture. The reason why black is used is that color materials of C, M and Y can be saved, the reproducibility of shadow portions can be improved, and gray balance can be ensured easily (the density of black can be increased) in comparison with image forming by only three primary colors of C, M and Y. As color materials, inks are used in printing and part of printers and toners are used in color copying and most color printers.

In order to form color images using four colors, it is required to convert C, M and Y data (color data) into C, M, Y and K data (color data and black data), which is referred to as a black-coloring process.

As a black-coloring algorithm, "Logical Algorithm of Black Ink Printing" is disclosed by Shinji Kita in the fifth Chromatic Engineering Conference, p 59–62, 1988, according to which, even if a black-coloring signal is maximum, color signals can be reduced by black-coloring, and the amount of black is increased in achromatic-color high-density portions and the amount of black is increased as much as possible in chromatic color portions as well. This method is known as a GCR (Gray Component Replacement) method which permits good color reproduction using the average overlapping model for dots which overlap in the black-coloring process.

In the GCR method, however, there is a problem that the consumption of materials for chromatic colors increases because chromatic color materials are further used although the amount of black has already reached a maximum. In addition, there is another problem that color materials, toners in particular, may peel off paper when the total amount of all the color material of black, C, M, and Y exceeds a given amount.

On the other hand, C, M, Y and K signals resulting from the black-coloring process have advantages that black is reproduced deeply and the reproducibility of chromatic colors in high-density portions is not degraded by the use of too much black in those portions.

However, the superposition (or misalignment) of multiple color materials and the misalignment of black must be taken into consideration.

For example, if, when the amount of black is little in an achromatic high-density area adjacent to an area which is printed in black only (black area), the black area and the high-density area are displaced relative to each other, then not a black image but a white image will be produced. This is due to the fact that a difference in density is produced between the black area and the adjacent area because a color in the adjacent area which should originally have been represented by the superposition of colors is represented by black only.

BRIEF SUMMARY OF THE INVENTION

An object of the present invention is to provide a color image processing device which is adapted for image forming apparatus and which has an increased degree of freedom in black-coloring processing based on the GCR system and permits color images which have good color reproducibility and are less susceptible to position displacement in black-colored portions to be output without affecting image processing on portions other than black-coloring portions and peeling of color materials.

The present invention provides a color image forming apparatus comprising: black-coloring processing portion for decomposing first color image signals each corresponding to one of multiple colors into second color signals and a black signal, and output section for outputting the second color signals and the black signal as a color image using chromatic color materials and a black color material, and wherein the black-coloring processing portion decomposes the first color signals into the second color signals and the black signal in accordance with $K=f(\min(I))$ $A=h(I)-j(g(\min(I)))$ $B=i(I)-k(g(\min(I)))$ $I'=A \div B \ (A \neq B \text{ or } B \neq 0)$ where K is the black signal, I is the first color signals, I' is the second color signals, $\min(I)$ is the minimum among the first color signals, $f(\min(I))$ is a function of $\min(I)$, $g(\min(I))$ is a function of $\min(I)$, $h(I)$ is a function of I, $i(I)$ is a function of I, $j(g(\min(I)))$ is a function of $g(\min(I))$, and $k(g(\min(I)))$ is a function of $g(\min(I))$.

In addition, the present invention provides a color image forming apparatus comprising: first range correction section for compressing the signal range of first color image signals each corresponding one of multiple colors to produce second color signals; black-coloring processing portion for decomposing the second color image signals from the first range correction section into third color signals and a black signal; second range correction section for expanding the signal range of the third color signals and the black signal; and output section for outputting the color signals and the black signal from the second range correction section as a color image, and wherein the black-coloring processing portion decomposes the first color signals into the second color signals and the black signal in accordance with $K=f(\min(I))$ $A=I-g(\min(I))$ $B=I-g(\min(I))$ $I'=A \div B \ (A \neq B \text{ or } B \neq 0)$ where K is the black signal, I is the second color signals, I' is the third color signals, $\min(I)$ is the minimum among the second color signals, $f(\min(I))$ is a function of $\min(I)$, $g(\min(I))$ is a function of $\min(I)$, $h(I)$ is a function of I, $i(I)$ is a function of I, j(g(min(I))) is a function of g(min(I)), and k(g(min(I))) is a function of g(min(I)).

Moreover, the present invention provides a color image forming apparatus comprising: color signal switching section for, at normal operation time, selectively outputting signals supplied directly or indirectly from color conversion section and, at color conversion table creation time, selectively outputting arbitrarily set signals to black-coloring processing portion; output section for outputting color signals and a black signal decomposed by the black-coloring processing portion as a color image; color data extraction section for extracting color data from image data outputted by the output section; and color conversion information creation section for creating To information representing a transformat ion relationship from a color coordinate system before the color conversion to a color coordinate system after the color conversion on the basis of the correspondence between the extracted color data and the arbitrarily set signals, and wherein the black-coloring processing portion decomposes the first color signals into the second color signals and a black signal in accordance with $$K=\alpha \times (min(I))$$
$$A=g(I)-h(k_2)$$
$$B=i(I)-j(k_2)$$
$$I'=A \div B \ (A \neq B \ or \ B \neq 0)$$

where K is the black signal, I is the first color signals, I' is the second color signals, min(I) is the minimum among the first color signals, $\alpha$ is f(min(I) or a constant, $k_2$ is the amount by which underlying color is removed (less than min(I)), g(min(I)) is a function of min(I), h($k_2$) is a function of $k_2$, i(I) is a function of I, and j($k_2$) is a function of $k_2$.

Furthermore, the present invention provides a color image forming apparatus comprising: color signal switching section for, at normal operation time, selectively outputting signals supplied directly or indirectly from color conversion section and, at color conversion table creation time, selectively outputting arbitrarily set signals to first range correction section for compressing the signal range of input signals; black-coloring processing portion for performing a black-coloring process on the signals corrected by the first range correction section; second range correction section for expanding the signal range of the signals subjected to the black-coloring process by the black-coloring processing portion; color data extraction section for extracting color data from image data outputted by the output section; and color conversion information creation section for creating information representing a transformation relationship from a color coordinate system before the color conversion to a color coordinate system after the color conversion on the basis of the correspondence between the extracted color data and the arbitrarily set signals, and wherein the black-coloring processing portion decomposes the first color signals into the second color signals and the black signal in accordance with $$K=f(min(I))$$
$$A=I-g(min(I))$$
$$B=I-g(min(I))$$
$$I'=A \div B \ (A \neq B \ or \ B \neq 0)$$

where K is the black signal, I is the second color signals, I' is the third color signals, min(I) is the minimum among the second color signals, f(min(I)) is a function of min(I), g(min(I)) is a function of min(I), h(I) is a function of I, i(I) is a function of I, j(g(min(I))) is a function of g(min(I)), and k(g(min(I))) is a function of g(min(I)).

Further, the present invention provides a color image forming apparatus comprising: black-coloring processing portion for decomposing first color image signals each corresponding to one of multiple colors into second color signals and a black signal; extraction section for extracting an image area to be output in black only in the color signals; black conversion section for converting color image signals for the image area to be output in black only into black signals; and output section for outputting a color image corresponding to the second color signals and the black signals from the black conversion section, and wherein the black-coloring processing portion decomposes the first color image signals into the second color signals and the black signal so that the black signal is increased preferentially in achromatic high-density image portions, the color signals are increased in other image portions, and the total of the amounts of color materials and the amount of black material used in the output section is not larger than a predetermined value.

In addition, the present invention provides a color image forming apparatus comprising: color signal switching section for, at normal operation time, selectively outputting signals supplied directly or indirectly from color conversion section and, at color conversion table creation time, selectively outputting arbitrarily set signals to black-coloring processing portion; extraction section for extracting an image area to be output in black only in the color signals; black conversion section for converting color image signals for the image area to be output in black only extracted by the extraction section into black signals; output section for outputting color signals and a black signal decomposed by the black-coloring processing portion as a color image; color data extraction section for extracting color data from image data outputted by the output section; and color conversion information creation section for creating information representing a transformation relationship from a color coordinate system before the color conversion to a color coordinate system after the color conversion on the basis of the correspondence between the extracted color data and the arbitrarily set signals, and wherein the black-coloring processing portion decomposes the first color image signals into the second color signals and the black signal so that the black signal is increased preferentially in achromatic high-density image portions, the color signals are increased in other image portions, and the total of the amounts of color materials and the amount of black material used in the output section is not larger than a predetermined value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A, 3B and 3C show the contents of the lookup tables of each shown in FIG. 2;

FIG. 4 is a schematic block diagram of an image forming apparatus according to another embodiment of the present invention;

FIG. 5 is a diagram for use in explanation of an example of range compression used in the image forming apparatus shown in FIG. 4;

FIG. 6 is a diagram for use in explanation of an example of range expansion used in the image forming apparatus shown in FIG. 4;

FIGS. 8A and 8B show the contents of the lookup tables of each shown in FIG. 6;

FIG. 15A is a diagram for use in explanation of a state where a black-coloring process (add (K)) is performed on the pixel values shown in FIG. 14A using LUT1 shown in FIG. 13;

FIG. 15B is a diagram for use in explanation of the timing of an identification signal for a predetermined pixel shown in FIG. 15A, one pixel being represented doubled in comparison with that in FIG. 14B because of addition of K shown in FIG. 15A;

FIG. 15C is a diagram for use in explanation of a state where a black-coloring process (add (K)) is performed with respect to the identification signal shows in FIG. 15B on the pixel values shown in FIG. 14A using LUT1 and LUT2 shown in FIG. 13;

FIG. 15D is a diagram for use in explanation of the position displacement of C and K in the opposite directions as the result of the process shown in FIG. 15C;

FIG. 16A is a diagram for use in explanation of the result of a conventional black-coloring process on the pixel values shown in FIG. 14A for comparison with the diagram shown in FIG. 15D;

FIG. 16B is a diagram for use in explanation of the timing of an identification signal for a predetermined pixel shown in FIG. 16A, one pixel being represented doubled in comparison with that in FIG. 14B because of addition of K shown in FIG. 16A;

FIG. 16C is a diagram for use in explanation of the result of a conventional black-coloring process is performed with respect to the identification signal shows in FIG. 16B on the pixel values shown in FIG. 16A;

FIG. 16D is a diagram for use in explanation of the position displacement of C and K in the opposite directions as the result of the process shown in FIG. 16C;

FIG. 17A is a diagram for use in explanation of the result of the conventional black-coloring process on the pixel values shown in FIG. 14A for comparison with the diagram shown in FIG. 15D, in which case the amount by which the under color removal is simply increased to increase the amount of black (K);

FIG. 17B is a diagram for use in explanation of the timing of an identification signal for a predetermined pixel shown in FIG. 17A, one pixel being represented doubled in comparison with that in FIG. 14B because of addition of K shown in FIG. 17A;

FIG. 17C is a diagram for use in explanation of the result of the conventional black-coloring process is performed with respect to the identification signal shows in FIG. 17B on the pixel values shown in FIG. 17A, in which case the amount by which the under color removal is simply increased to increase the amount of black (K);

FIG. 17D is a diagram for use in explanation of the position displacement of C and K in the opposite directions as the result of the process shown in FIG. 17C;

DETAILED DESCRIPTION OF THE INVENTION

Hereinafter, the embodiments of the present invention will be described with reference to the accompanying drawings. The invention is not to be limited to the embodiments to be described below.

Figure 1:
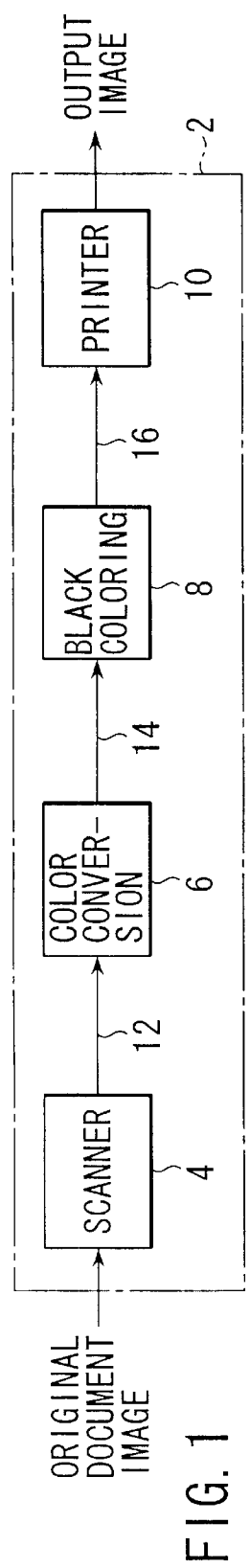
FIG. 1 is a schematic block diagram of a color image forming apparatus according to a first embodiment of the present invention.

FIG. 1 is a block diagram of a digital copying apparatus (image forming apparatus) which has a color image processing device of the present invention is adapted.

The digital color copying apparatus 2 includes an image scanner 4 that decomposes a color image of an original into R (red), G (green) and B (blue) components and performs opto-electric conversion on each color component to provide RGB signals, a color conversion unit 6 that converts the RGB signals into CMY signals of C (cyan), M (magenta) and Y (yellow) adapted to image forming by a printer to be described later, a black-coloring unit 8 that separates a black component from the CMY signals to produce a C, signal, an M' signal, a Y' signal, and a black-component K signal, and a printer 10 that outputs a color image on the basis of the C', M', Y' and K signals from the black-coloring unit 8. The digital copying apparatus 2 has its each unit controlled by a controller not shown.

In the digital color copying apparatus 2 thus arranged, image data 12, i.e., the RGB image signals, obtained from the scanner 4 are converted into the CMY signals 14 by the color conversion unit 6 which are then used for image forming by the printer 10.

The black-coloring process of the black-coloring unit 8 will be described next. It is supposed here that each image data takes one of 256 values in the range of 0 to 255. One of 256 values that "0" corresponds to low density, while "255" corresponds to high density.

Figure 2:
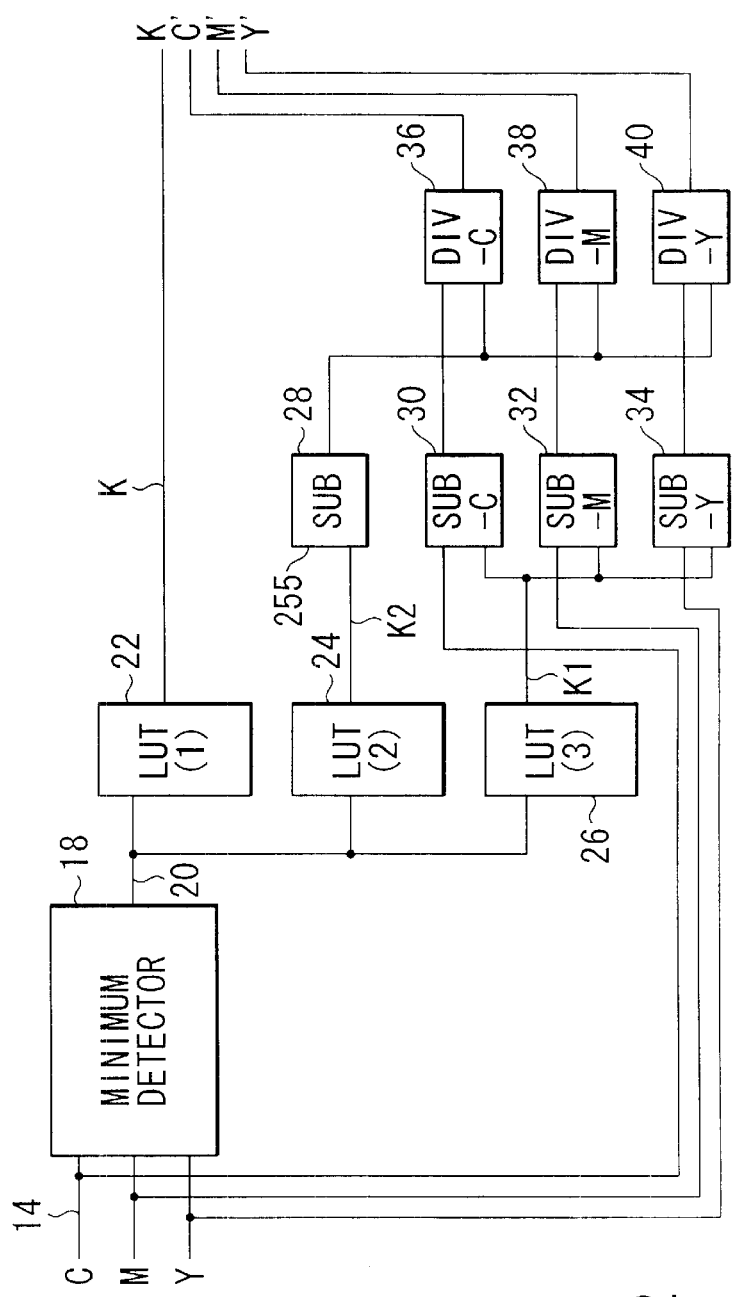
FIG. 2 is a block diagram of the black-coloring processing unit shown in FIG. 1.

In the conversion of the CMY signals into the C', M', Y' and K signals, there are the following relations:

$$K = \alpha \times \min(C, M, Y),$$

$$C' = (C-k_1)/(255-k_2),$$

$$M' = (M-k_1)/(255-k_2),$$

$$Y' = (Y-k_1)/(255-k_2),$$

$$(C-k_1) \neq (255-k_2), (255-k_2) \neq 0,$$

$$(M-k_1) \neq (255-k_2), (255-k_2) \neq 0, \text{ and}$$

$$(Y-k_1) \neq (255-k_2), (255-k_2) \neq 0 \tag{1}$$

where $\alpha$ is the black rate (100%→1, 0%→0), min(C, M, Y) is the minimum value among the C, M, and Y component values, K is the black signal representing the amount of black (corresponding to LUT(1) 22 in FIG. 2), and $k_1$ and $k_2$ are constant numbers of an under color removal (corresponding to LUT(3) 26 and LUT(2) 24 in FIG. 2).

In the above relations, each of k, $k_1$ and $k_2$ is set independently. $(C-k_1) \neq (255-k_2)$ and $(255-k_2) \neq 0$ correspond to A≠B and B≠0, respectively, in the appended each of the claims.

As shown in FIG. 2, the black-coloring unit 8 has a minimum value detector 18 which detects the minimum value among the CMY signals from the color conversion unit 6.

The minimum value 20 detected by the minimum value detector 18 is an address assigned to a first lookup table (LUT(1)) 22 shown in FIG. 3A. When addressed, the lookup table 22 provides the amount of black (K), for the minimum value 20.

A second lookup table (LUT(2)) 24 (FIG. 3B) is addressed by the minimum value 20 to provide $k_2$ which is used in determining each of the C', M' and Y'. Likewise, a third lookup table (LUT(3)) 26 (FIG. 3C) is addressed by the minimum value 20 to provide $k_1$ which is used in determining each of the C', M' and Y'. Each of the first, second and third lookup tables 22, 24 and 26 convert the minimum value 20 detected by the minimum value detector 18 to predetermined level of output signals, $k_1$ and $k_2$ are less than 255 and K is set to 255.

Using $k_2$ (secondary constant number of an under color removal, shown in FIG. 3C) obtained from the second lookup table 24, a subtracter 28 provides the denominator, $(255-k_2)$, in the above equations (1). using $K_1$ (primary constant number of an under color removal, shown in FIG. 3B) obtained from the third lookup table 26, subtracters 30, 32 and 34 provide the numerators, $(C-k_1)$, $(M-k_1)$ and $(Y-k_1)$, respectively, in the above equations (1).

Subsequently, dividers 36, 38 and 40 provide C', Ml and Y', respectively, which have under colors are removed (UCR).

The above black-coloring processing prevents the proportion of black in a color other than black from varying sharply. In addition, the black-coloring processing can prevent the amount of black from varying sharply and reduce the black amount (the amount of color material) even if the black amount is maximum prior to the processing. As is evident from FIG. 2, the black amount K and the under colors are removed signals (UCR) C', M' and Y' can be set independently and the constant numbers under color removal, $K_1$ and $k_2$ can be set independently, thus providing images with good color reproducibility.

A comparison is made with the conventional GCR system under the same conditions. When a black rate is 90% and each of C, M and Y is maximum, C', M' and Y' after black-coloring remain maximum and K becomes 230. When C and M are maximum and Y is 250, Y' becomes 212. Whereas a variation before black-coloring is 5, a variation after black-coloring is 43, which is about nine times larger than that before black-coloring. As a result, quasi contours will be produced.

In this case, signal values for C and M remain unchanged and the total amount of four color materials therefore becomes maximum, exceeding the allowable total amount of color materials for printing. Thus, the peeling of color materials will occur.

FIG. 4 is a schematic block diagram of a color image processing device according to another embodiment. In this figure, like reference numerals are used to denote corresponding components to those in FIG. 1 and detailed descriptions thereof are omitted.

As shown in FIG. 4, the digital color copying apparatus 102 has the color conversion unit 6 for converting RGB signals from the scanner 4 into CMY signals, a first range correction circuit 104 for compressing the range of each of the CMY signals from the color conversion unit 6, the black-coloring processing unit 8 for separating a black component from each of the CMY signals having their ranges compressed to produce C', M' and Y' signals and a black component K signal, a second range correction circuit 106 for expanding the range of each of the C', M', Y' and K signals, and the printer 10 for producing a color image on the basis of the expanded C', M', Y' and K signals.

The first range correction circuit 104 compresses each of the C, M and Y signals having a value of 255 in the range of 0 to 255 to, e.g., 220 as shown in FIG. 5. The second range correction circuit 106 expands an output of 220 to 255 as shown in FIG. 6.

Figure 7:
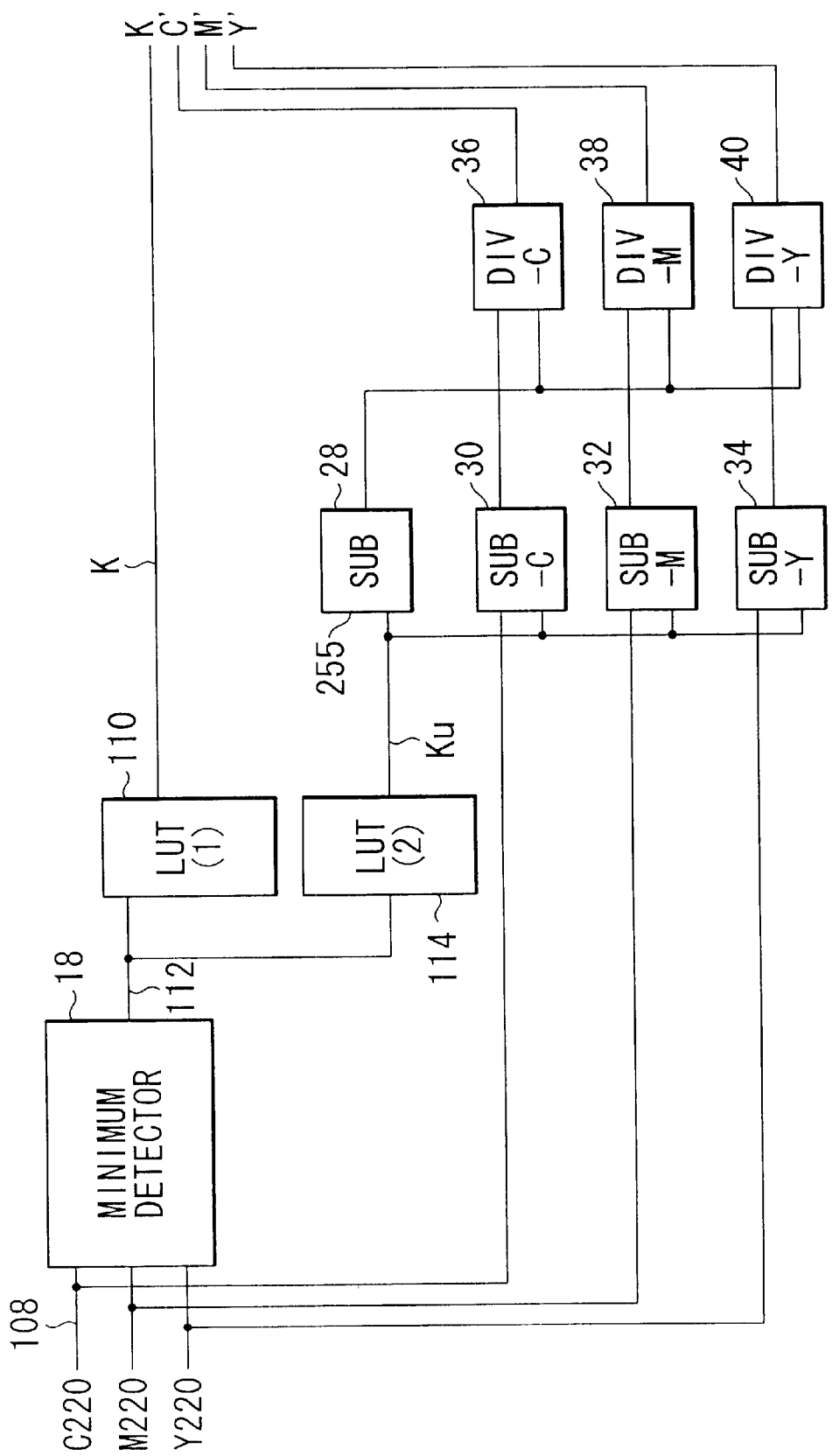
FIG. 7 is a block diagram of the black-coloring processing unit shown in FIG. 4;.

FIG. 7 is a block diagram of the black-coloring processing unit 6 of the color copying apparatus shown in FIG. 4. As described previously with reference to FIG. 2, in the conversion of the CMY signals to the C', M', Y' and K signals, there are the following relations:

$$K = \alpha \times \min(C_{220}, M_{220}, Y_{220}),$$

$$C' = (C_{220}-k_U)/(255-k_U),$$

$$M' = (M_{220}-k_U)/(255-k_U),$$

$$Y' = (Y_{220}-k_U)/(255-k_U), \text{ and}$$

$$(255-k_U) \neq 0 \tag{2}$$

where $\alpha$ is the black rate (100%→1, 0%→0), min(C, M, Y) is the minimum value among the C, M, and Y component values, $k_U$ is the amount by which underlying color is removed, and $C_{220}$, $M_{220}$ and $Y_{220}$ are C, M and Y signals output from the first range correction circuit 104 which have their respective maximum value compressed to 220.

As shown in FIG. 7, in the black-coloring processing unit 8, the minimum value detector 18 detects the minimum value 110 among the range-compressed $C_{220}$, $M_{220}$ and $Y_{220}$ signals 108 from the first range correction circuit 104. A first lookup table (LUT(1)) 110 shown in FIG. 8 is addressed by the minimum value 112 to determine a black-coloring amount K corresponding to that minimum.

A second lookup table (LUT(2)) 114 (FIG. 8B) is also addressed by the minimum value 112 of each to determine $k_U$ contained in the denominators in the above relations and to determine the C', M', and Y' signals. The first and second lookup tables 110 and 114 are set that each of the C', M' and Y' signals is less than the maximum of 220.

Using $k_U$ obtained from the second lookup table 114, the subtracter 28 provides the denominator in the above relations (2) and the subtracters 30, 32 and 34 provide the numerators.

Subsequently, the dividers 36, 38 and 40 provide range-compressed C', M' and Y' signals 116, which are then expanded by the second range correction circuit 106 and output to the printer 10.

Thus, even if each of the maximum value among the C, M and Y signals is 255, the range-corrected output is set to 220, and for C', M' and Y', each of the maximum values is set to values less than 255, thus allowing black-coloring processing with high degree of freedom. Thereby, good color reproducibility is ensured.

Figure 9:
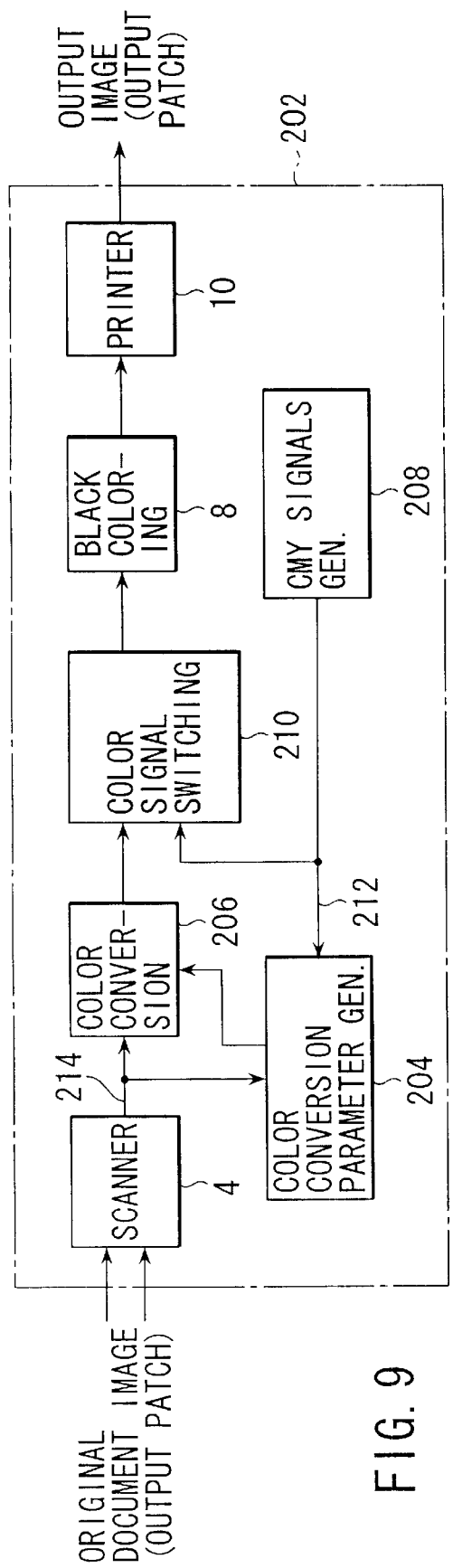
FIG. 9 is a schematic block diagram of an image forming apparatus according to still another embodiment of the present invention.

FIG. 9 is a schematic block diagram of a color image processing device according to still another embodiment. In this figure, like reference numerals are used to denote corresponding components to those in FIG. 1 and detailed descriptions thereof are omitted.

As shown in FIG. 9, a digital color copying apparatus 202 include a color conversion parameter generator 204 which generates color conversion parameters for converting RGB signals from the scanner 4 in accordance with predetermined rules, a color conversion unit 206 for converting the RGB signals into CMY signals in accordance with the color conversion parameters generated by the color conversion parameter generator 204, a CMY signal generator 208 for generating arbitrary CMY signals independently of the color conversion unit 206, a color signal switching unit 210 for switching between the CMY signals from the color conversion unit and the CMY signals generated by the CMY signal generator, the black-coloring processing unit 8 for separating black components from the CMY signals supplied through the switching unit from either the color conversion unit 206 or the CMY signal generator to produce C', M' and Y' signals and a black component K signal, and the printer 10 for outputting a color image on the basis of the C', M' and Y' signals and the K signal.

The color conversion parameter generator 204 generates parameters 214 for taking correlation between input RGB signals obtained by the scanner 4 reading a color pattern image produced by the printer 10 from the CMY signals 212 generated by the CMY signal generator 208 and the output CMY signals 212 generated by the CMY signal generator 208. The parameters are generated through the use of the least square method.

The color conversion unit 206 subjects the input RGB signals to color conversion according to the parameters generated by the color conversion parameter generator 204.

Thus, the RGB signals read by the scanner 4 and entered into the color conversion unit 206 is compensated by the color conversion unit 206. The compensation in the color con version unit 206 includes CMY signals generated by the CMY signal generator 208, signals subjected to the black-coloring process in the black-coloring processing unit 8, the color conversion characteristics of the color conversion unit 206 including the color reproducibility inherent in the scanner 4 (the reading system), the color reproducibility inherent in the printer 10 (the output system) and the effects of black-coloring process by the black-coloring processing unit 8. In the black-coloring processing unit 8, the process is performed according to equations (1) as described previously with reference to FIG. 2.

Thus, greater freedom is ensured in black-coloring processing and an influence of color misalignment between the reading system and the output system, and an influence of the black-coloring are removed, thus allowing for color reproduction.

A color image forming apparatus according to an embodiment of the invention includes a color signal switching section for, at normal operation time, selectively outputting signals supplied directly or indirectly from a color conversion section and, at color conversion table creation time, selectively outputting arbitrarily set signals to a black-coloring processing portion.

Figure 10:
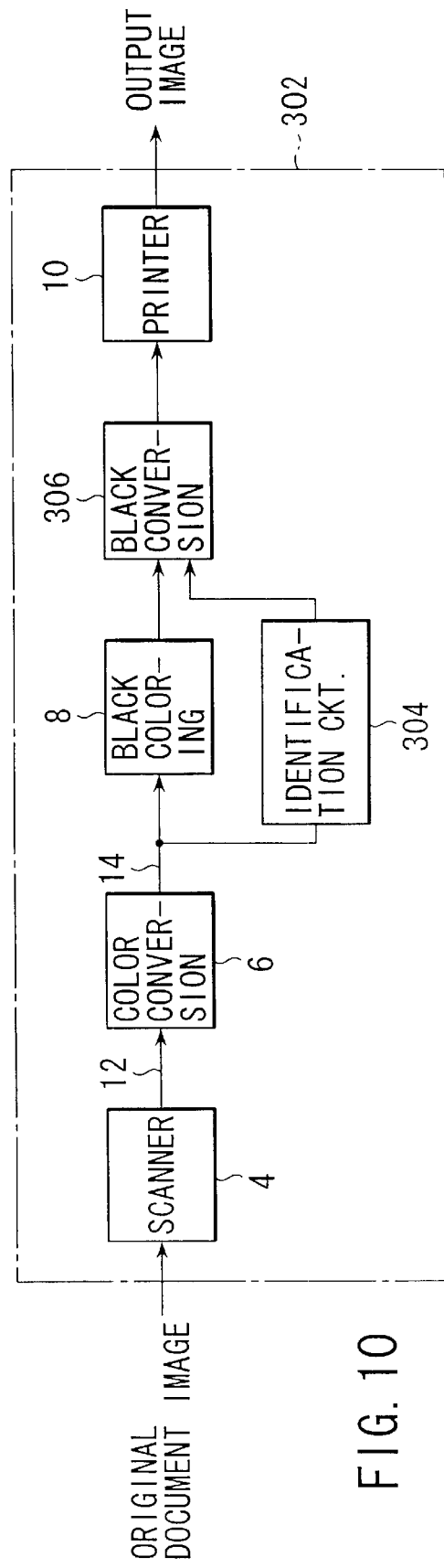
FIG. 10 is a schematic block diagram of an image forming apparatus according to a further embodiment of the present invention.

FIG. 10 is a schematic block diagram of a color image processing device according to still another embodiment. In this figure, like reference numerals are used to denote corresponding components to those in FIG. 1 and detailed descriptions thereof are omitted.

As shown in FIG. 10, a digital color copying apparatus 302 has the color conversion unit 206 for converting the RGB signals from the scanner 4 into CMY signals, an identification circuit 304 for identifying black character areas in the CMY signals to output a black identification signal, the black-coloring processing unit 8 for separating black components from the CMY signals to produce C', M' and Y' signals and a black component K signal, a black conversion unit 306 for determining which of the C', M' and Y' signals from the black-coloring unit 8 and the black character information obtained by the identification circuit 304 to be output, and the printer 10 for outputting a color image on the basis of the image signals from the black conversion unit 306.

Figure 11:
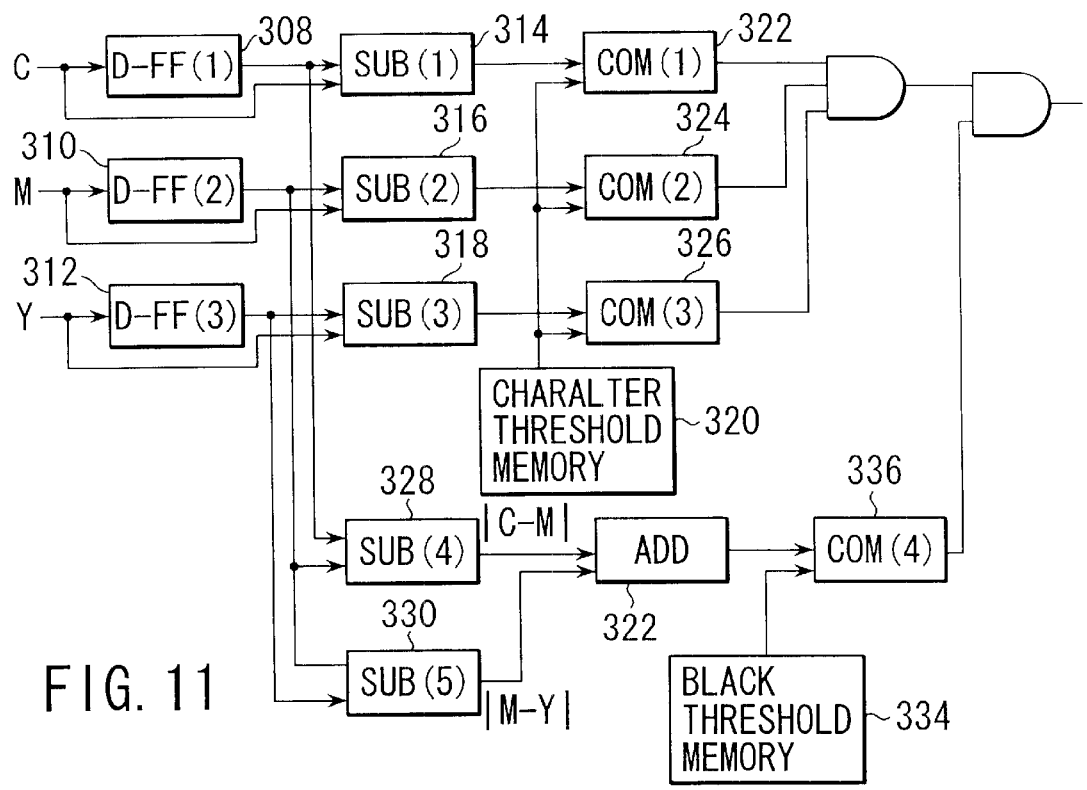
FIG. 11 is a block diagram of the black-coloring processing unit shown in FIG. 10.

In the identification circuit 304, as shown in FIG. 11, each of direct flip-flop (D-FF) circuits 308, 310 and 312, which are connected to receive C, M and Y signals, respectively, has its input and output connected to the inputs of a corresponding respective one of subtracters 314, 316 and 318 to calculate a differential absolute value between adjacent pixels. Each of comparators 322, 324 and 326 makes a comparison between the differential absolute value obtained by a corresponding one of the subtracters and a character threshold stored in a character threshold memory 320. When the character threshold is exceeded for each of C, M and Y, each of the input information in each of the comparators is identified as a character. A subtracter 328 has its inputs connected to the outputs of the respective direct flip-flop circuits 308 and 310 to provide a differential absolute value |C–M|. A subtracter 330 has its inputs connected to the outputs of the respective direct flip-flop circuits 310 and 312 to provide a differential absolute value |M–Y|. The differential absolute values are added together in an adder 332 and the result is then compared with black threshold data stored in a black threshold memory 334 by a comparator 336. For each of pixels that are black and form a character, an output data "1" is output from the discrimination circuit, otherwise an output "0" is output.

Figure 12:
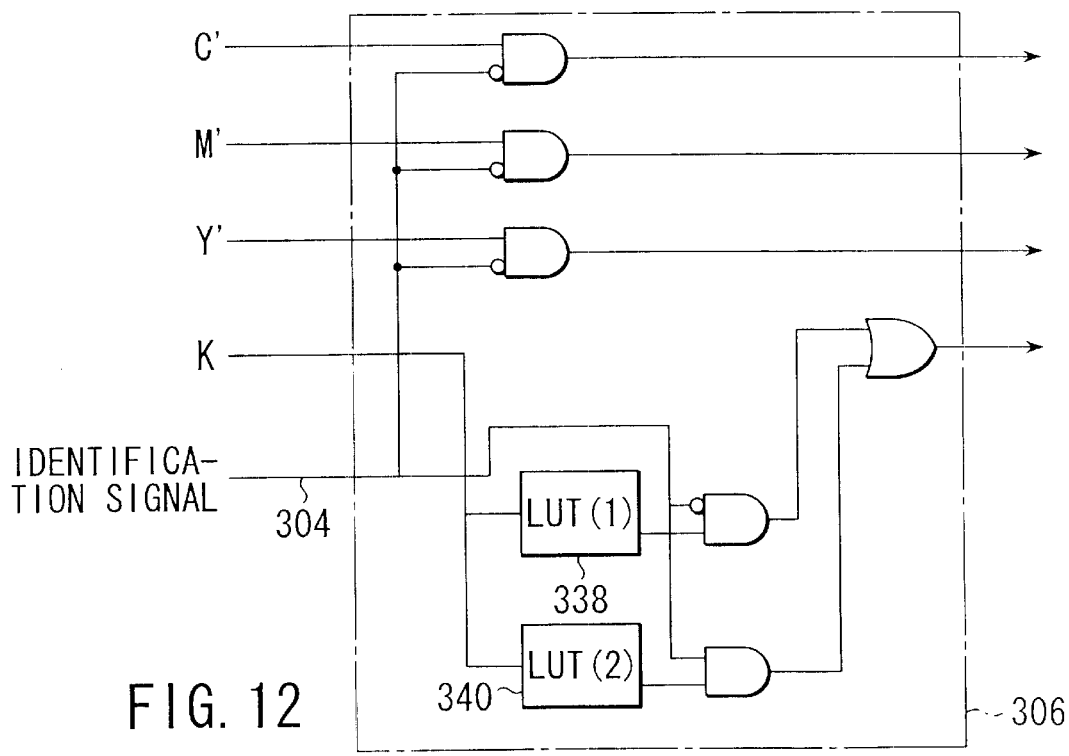
FIG. 12 is a schematic diagram of the black conversion unit of the black-coloring processing unit shown in FIG. 11.

In the black conversion circuit 306, as shown in FIG. 12, when the identification signal is "0", the C', M' and Y' signals input from the black-coloring unit 8 are output as they are. When the identification signal is "1", the signals other than the black signal are made "0".

Figure 13:
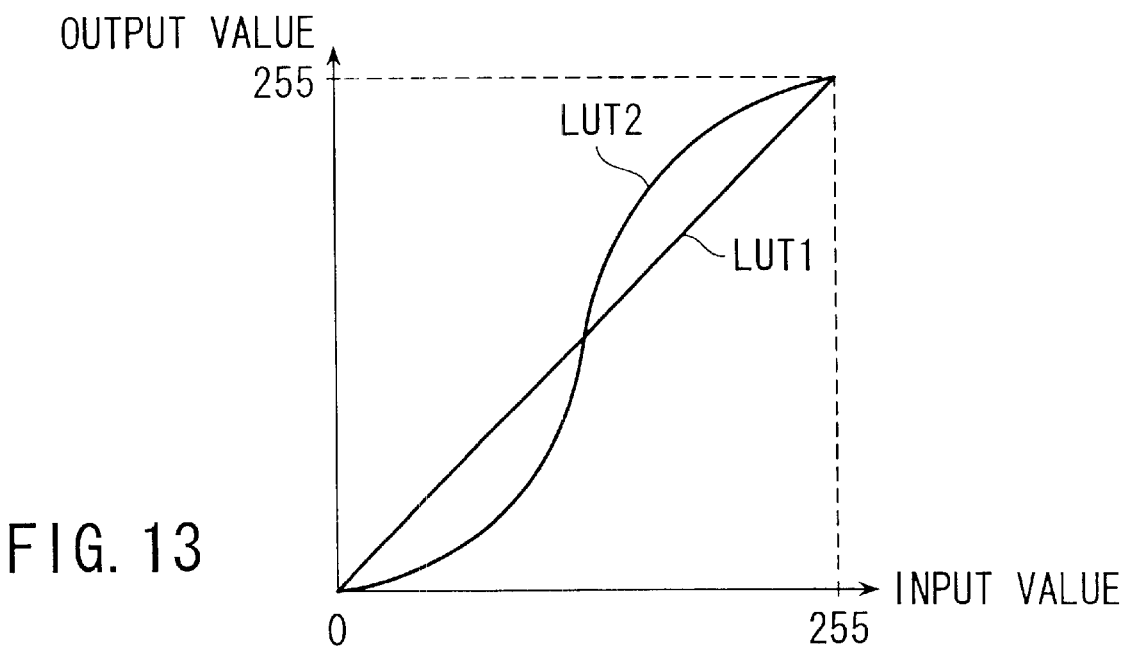
FIG. 13 shows the contents of the lookup tables of each shown in FIG. 11.

The K signal is output to the printer 10 as it is from a lookup table (LUT(1)) 338 when it is a non-black character and output from a lookup table (LUT(2)) 340 with such an emphatic characteristic as shown in FIG. 13 when it is a black character.

In this manner, the quality of black characters can be improved by emphasizing black character areas.

FIGS. 14A, 14B, 15A to 15D, 16A to 16D, 17A to 17D, and 18 are diagrams for use in explanation of the results of the black-coloring process of the present id invention shown in FIGS. 11 to 13 and the conventional black-coloring process. A description is given here in terms of C of CMY signals (an achromatic signal of C=M=Y). FIGS. A, 16A and 17A shows a state that the black-coloring process using LUT1 is performed for the input signals. FIGS. 15C, 16C and 17C shows a state that the black-coloring process using LUT2 is executed in addition to the black-coloring process using LUT1 based on the identification signal shown in FIGS. 15B, 16B and 17B.

Figure 14A:
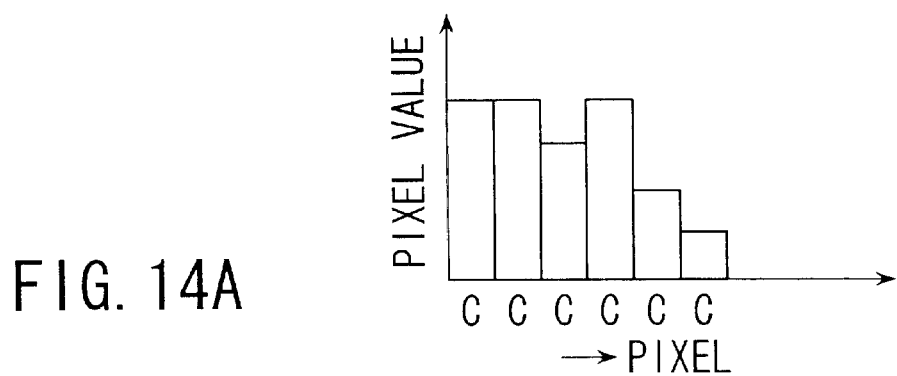
FIG. 14A is a diagram for use in explanation of pixel values for emphasis characteristics in black-coloring process shown in FIGS. 11, 12 and 13.
Figure 14B:
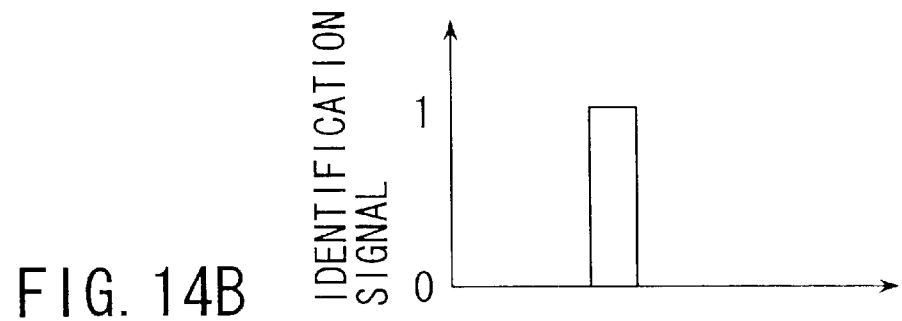
FIG. 14B is a diagram for use in explanation of the timing of an identification signal for a predetermined pixel of the pixel values shown in FIG. 14A.

FIG. 14A is a diagram for use in explanation of pixel values that provide the basis for describing the emphatic characteristic in the black coloring process shown in FIGS. 11 to 13 in the image forming apparatus shown in FIG. 10. FIG. 14B is a diagram for use in explanation of the identification signal supplied for a given one of the pixels shown in FIG. 14A (only a pixel for which the identification is 1 is identified as a character).

FIG. 15A shows a black-colored state where K is added to each of the pixel values shown in FIG. 14A using the LUT1 of FIG. 13 when the identification signal for a given pixel is applied at the time shown in FIG. 15B. In FIG. 15B, which is equivalent to FIG. 14B, the width of the identification signal is shown increased because one pixel is represented by C+K (doubled) in FIG. 15A.

FIG. 15C shows a state where K is added to the pixel values shown in FIG. 14A using both the LUT1 and go the LUT2. Since the amount of black and the amounts of other colors are set large, black looks deep.

FIG. 15D shows a state that the pixels C shown in FIG. 15C are printed in such a manner that they are shifted in left direction by a certain distance, for example, by one pixel. Numerals 1 to 5 which are attached to pixels C and shown in FIGS. 15A, 15C and 15D respectively denote the same corresponding pixels C throughout FIGS. 15A, 15C and 15D.

As shown in FIG. 15D, since black and color materials are increased in amount, black (K) and color images are less susceptible to displacement in position.

FIG. 16A shows a black-colored state where K is added to each of the pixel values shown in FIG. 14A using the conventional black-coloring process when the identification signal for a given pixel is applied at the time shown in FIG. 16B. In FIG. 16B, which is equivalent to FIG. 14B, the width of the identification signal is shown increased because one pixel is represented by C+K (doubled) in FIG. 16A.

FIG. 16C shows a black-colored state where K is added to each of the pixel values shown in FIG. 14A using the conventional black-coloring process. Since colors in the neighborhood of a black image is not converted to black (K), the difference in density between an area emphasized as a character and adjacent pixels increases. FIG. 16D shows a state that the pixels C shown in FIG. 16C are printed in such a manner that they are shifted in left direction by a certain distance, for example, by one pixel, if a displacement in position occurs in the opposite directions between C and K as shown in FIG. 16D, the density of the adjacent pixels is decreased considerably, creating white-colored image portions. In this case, the image quality is degraded.

FIGS. 17A and 17C show a state where, in the case of pixel values shown in FIG. 14A, the under color removal (UCR) amount is increased simply and the K amount is increased using the conventional black-coloring process. In FIG. 17B, which is equivalent to FIG. 14B, the width of the identification signal is shown increased because of the addition of K in FIG. 17A.

In this case, as shown in FIG. 17D, the effect of displacement in position becomes difficult to occur because of the use of only black (K) (no color) in achromatic color, but the image density will look low and become susceptible to noise.

Figure 18:
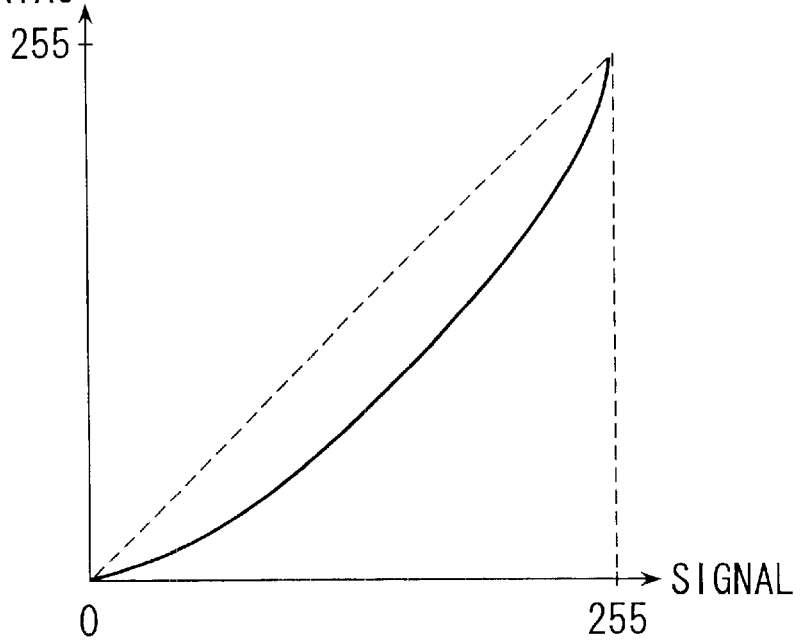
FIG. 18 is a diagram for use in explanation of the correction of an amount of an actual color material in the black-coloring process shown in FIG. 15D.

Even with the black-coloring process of the invention shown in FIG. 15D, if the amount of black and the amount of other color are increased simply, the peeling of color materials may occur. For this reason, a color material total amount lookup table not shown is prepared which maps internally processed signal values to the total of color material amounts actually supplied for image forming as shown in FIG. 18, which allows the formation of stable output images with no peeling of color materials.

Figure 19:
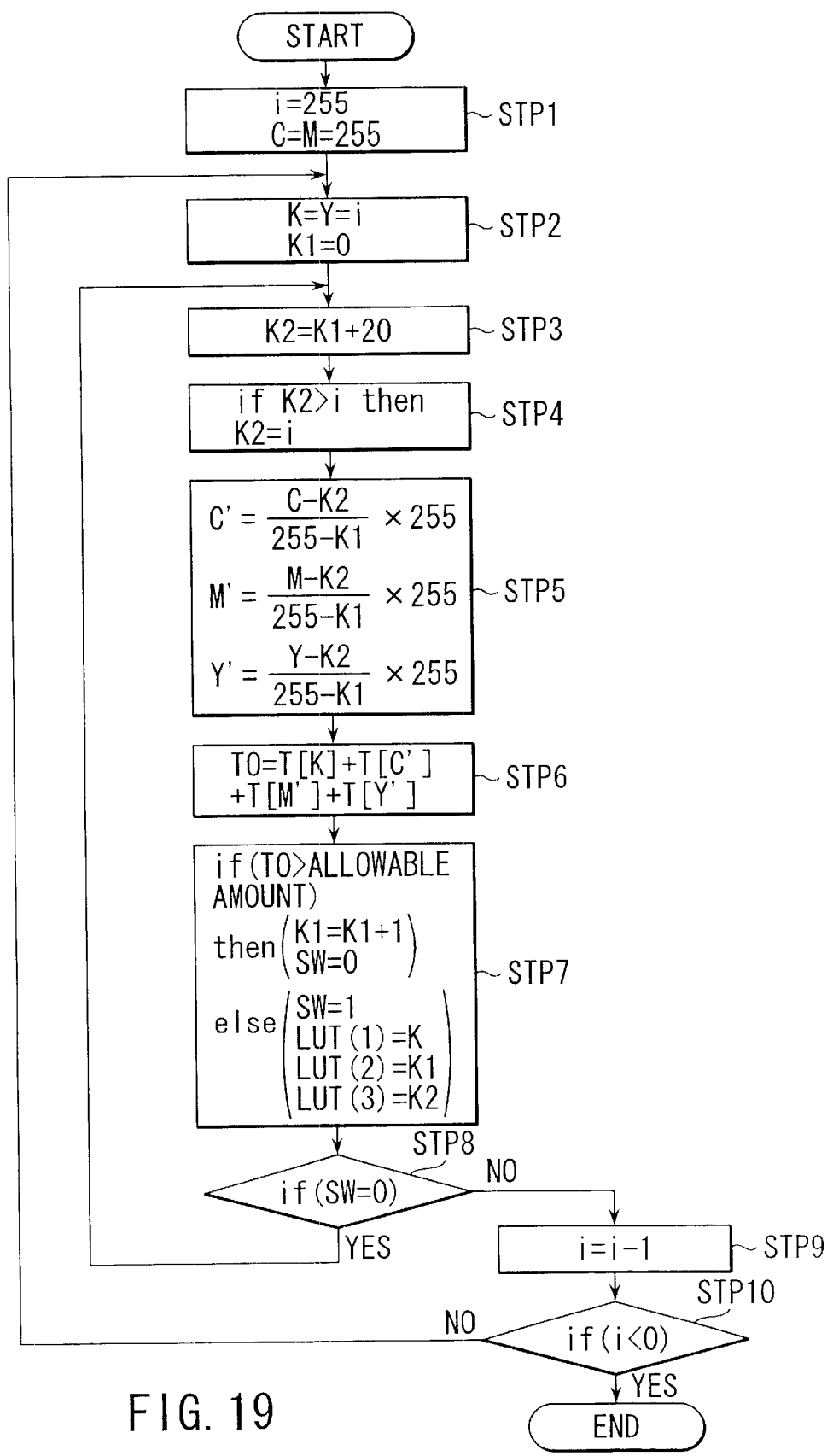
FIG. 19 is a flowchart for the procedure of determining the correction of the amount of the actual color material shown in FIG. 18.

FIG. 19 is a flowchart for the setup of the color material total amount lookup table.

In carrying out the black-coloring process as a function of the minimum used in relations (1), the peeling of color materials can be prevented by setting up a black table of a black-coloring processing in the case where two colors of C, M and Y become maximum in amount and the other color varies in amount with To as the total of amounts of four color materials.

Since data takes 256 values from 0 to 255, i is set to i=255 and two colors other than black (C and M here) are also set to C=M=255 (STP 1).

Next, K and Y are set to K=Y=i, and $k_1$ is set to $k_1=0$ (STP 2). $k_2$ is set to $k_2=K_1+20$ (STP 3).

If $k_2$ is larger than i, then $k_2$ is set to $k_2=i$ (STP 4).

Next, color material amount signals to be applied to the printer 10 are determined by $$C'=255(C-k_2)/(255-k_1),$$
$$M'=255(M-k_2)/(255-k_1) \text{ and}$$
$$Y'=255(Y-k_2)/(255-k_1) \text{ (STP 5).}$$
$$To=T[K]+T[C']+T[M']+T[Y']$$

is next determined (STP 6). T[K], T[C'], T[M'] and T[Y'] are the amounts of color material for the K, C', M' and Y' signal values and To is the total of these color material amounts.

If "To" is larger than a predetermined allowable amount, then $k_1$ is set to $k_1=k_1+1$ and sw to sw=0. If To is smaller than the allowable amount, then sw, LUT(1)[i], LUT(2)[i] and LUT(3)[i] are set to sw=1, LUT(1)[i]=K, LUT(2)[i]=$k_1$ and LUT(3)[i]=$k_2$ (STP 7).

A decision is then made as to whether sw is 0 or 1 (STP 8). If sw=0, then the procedure returns to step STP 3; otherwise, i=i−1 is determined (STP 9) and steps STP2 through STP 9 are repeated until i becomes negative (STP 10).

If the decision in step STP 10 is that i<0, then the amount of black that allows the black-coloring process with no peeling of color materials will have been determined for all black table values.

Figure 20:
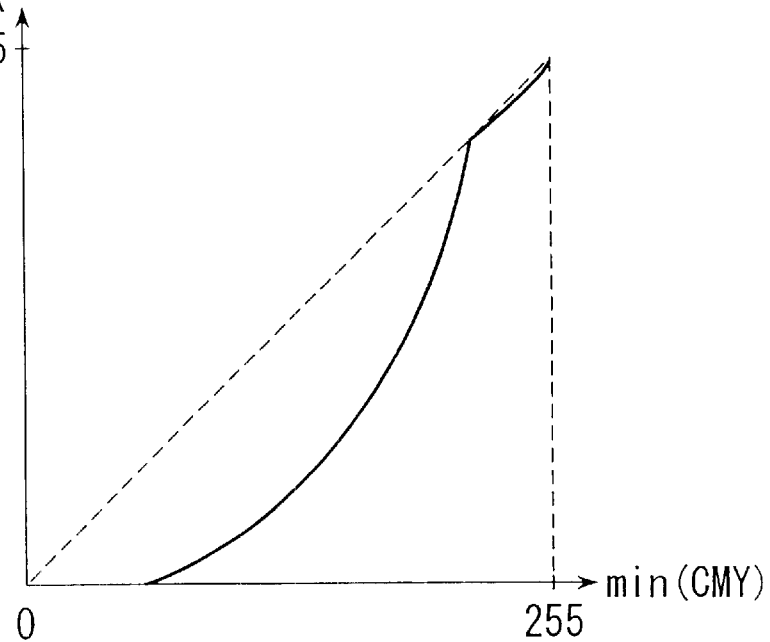
FIG. 20 is a diagram for use explanation of an example in which the amount of the actual color material shown in FIG. 18 is increased only in high-density portions.

FIGS. 18 and 19 illustrate the case where the black rate is 100%. Since areas in which the density of the boundary of a black character becomes a problem are high-density portions alone, a phenomenon by which the amount of black is increased in low-density portions can be prevented by setting an LUT so that the amount of black is increased only in high-density portions as shown in FIG. 20.

In mentioned above, the invention was described on the basis of the GCR (Gray Component Replacement) system, this is not restrictive. Any other black coloring process can be used provided that the balance between black and colors in the neighborhood of high-density achromatic portions and the maximum printing amounts of color materials are taken into consideration.

Although the above embodiments were described as using C, M and Y, this is not restrictive.

The black area extraction method is not limited by the above embodiments. Information which is known at image creation time may be used as in DTP (Desk Top Publishing).

As described above, in the image processing device of the invention, since the black-coloring process is allowed to have a degree of freedom, the amount of color material can be reduced by the black-coloring process even when the amount of color material is maximum prior to the black-coloring process.

Since the signal range is made variable before and after the black-coloring process, the process is allowed to have a degree of freedom without manipulating the basis black-coloring equations, allowing the amount of color material to be reduced by the black-coloring process even when the amount of color material is maximum prior to the black-coloring process.

Further, the black-coloring process is carried out to define the maximum amount of color material actually used in printing, the internal image processing can be performed without considering the amount of color material and the peeling of color material at print time can be prevented.

Since the black-coloring process is carried out to define the maximum amount of color material actually used in printing and the amount of black is increased on priority basis in achromatic high-density portions, the internal image processing can be performed without considering the amount of color material, the peeling of color material at print time can be prevented, and the degradation in image quality due to position displacement can be reduced.

As mentioned above, the black-coloring process is carried out to define the maximum amount of color material actually used in printing, the amount of black is increased on priority basis in achromatic high-density portions, and areas to be printed in black only are converted to black only, the internal image processing can be performed without considering the amount of color material, the peeling of color material at print time can be prevented, the image quality of the areas to be printed in black only can be improved, and the degradation in image quality due to position displacement can be reduced.

Although the embodiments were described in terms of black character areas only, the black character areas may be replaced with one color of black (K). In this case, unlike the prior art shown in FIGS. 16A to 16D, the surrounding black (K) will also become light, thus preventing the density from becoming reduced even if only the edges of logo characters are identified as black images. That is, since the black character areas are output in black (K) only, good images with no irregularities in density can be obtained.

Thus, the color image processing device of the present invention allows the black-coloring system to have a degree of freedom and can therefore reduce the amount of color material at print time unlike the GCR system.

By increasing the amount of black preferentially and allocating other colors to the remainder taking the maximum amount of color material in achromatic high-density portions into consideration without the black coloring process, the degradation in image quality can be made unnoticeable even if colors are displaced in printers. Further, by increasing the amount of other colors than black, color reproduction can be attained is less susceptible to noise.

According to the present invention, by creating a color conversion table on the basis of the results of the black-coloring process, the black-coloring process can be carried out relatively freely with good color reproducibility.

In the present invention, the functions of min (I), given as f(min(I)) and g(min(I)), can be, of course, whatever functions that utilize min(I). Thus, the functions may be those each being a combination of the maximum value max(I) and minimum value min(I) the color signal has before the black-coloring processing is carried out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A color image forming apparatus comprising:
a black-coloring processing portion for decomposing first color image signals each corresponding to one of multiple colors into second color signals and a black signal, and an output section for outputting the second color signals and the black signal as a color image using chromatic color materials and a black color material, and wherein the black-coloring processing portion decomposes the first color signals into the second color signals and the black signal in accordance with $$K=f(\min(I))$$

$$A=h(I)-j(g(\min(I)))$$

$$B=i(I)-k(g(\min(I)))$$

$$I'=A \div B (A \neq B \text{ or } B \neq 0)$$

where K is the black signal, I is the first color signals, I' is the second color signals, min(I) is the minimum among the first color signals, f(min(I)) is a function of min(I), g(min(I)) is a function of min(I), h(I) is a function of I, i(I) is a function of I, j(g(min(I))) is a function of g(min(I)), and k(g(min(I))) is a function of g(min(I)).

2. A color image forming apparatus according to claim 1, further comprising:
a minimum detector circuit, a, first lookup table for determining the amount of black material (K), a second lookup table for determining the amount of black material (k1) in color materials which has one of 256 values from 0 to 255, a third lookup table for determining the amount by which an underlying color is removed (k2) which has one of 256 values from 0 to 255, and three subtracters and three dividers for processing outputs of the lookup tables to calculate C', M' and Y' indicating the amounts of color materials wherein
said black signal K is calculated by $$K=\alpha \times \min(C, M, Y)$$

$$C'=(C-k_1)/(255-k_2)$$

$$M'=(M-k_1)/(255-k_2) \text{ and}$$

$$Y'=(Y-k_1)/(255-k_2)$$

where α is a black rate of up to 100%,
wherein C' corresponds to a cyan color signal with black components separated therefrom, Y' corresponds to a yellow color signal with black components separated therefrom, and M' corresponds to a magenta color signal with black components separated therefrom, and wherein K, C', Y' and M' correspond to output color signals used by the color image forming apparatus to provide a color image.

3. The color image forming apparatus according to claim 1, wherein the black-coloring processing portion decomposes the first color image signals into the second color signals and the black signal so that the total of the amounts of color materials and the amount of black material used in the output section is not larger than a predetermined value.

4. The color image forming apparatus according to claim 1, wherein the black-coloring processing portion decomposes the first color image signals into the second color signals and the black signal so that the black signal is increased preferentially in achromatic high-density image portions, the color signals are increased in other image portions, and the total of the amounts of color materials and the amount of black material used in the output section is not larger than a predetermined value.

5. A color image forming apparatus comprising:
a first range correction section for compressing a signal range of first color image signals each corresponding one of multiple colors to produce second color signals;
a black-coloring processing portion for decomposing the second color image signals from the first range correction section into third color signals and a black signal;
a second range correction section for expanding the signal range of the third color signals and the black signal; and
an output section for outputting the color signals and the black signal from the second range correction section as a color image,
and wherein the black-coloring processing portion decomposes the first color signals into the second color signals and the black signal in accordance with $K=f(\min(I))$ $A=h(I)-j(g(\min(I)))$ $B=i(I)-k(g(\min(I)))$ $I'=A \div B (A \neq B \text{ or } B \neq 0)$ where K is the black signal, I is the second color signals, I' is the third color signals, min(I) is the minimum among the second color signals, f(min(I)) is a function of min(I), g(min(I)) is a function of min(I), h(I) is a function of I, i(I) is a function of I, j(g(min(I))) is a function of g(min(I)), and k(g(min(I))) is a function of g(min(I)).

6. A color image forming apparatus comprising:
a color signal switching section for, at normal operation time, selectively outputting signals supplied directly or indirectly from a color conversion section and, at color conversion table creation time, selectively outputting arbitrarily set signals to a black-coloring processing portion;
an output section for outputting color signals and a black signal decomposed by the black-coloring processing portion as a color image;
a color data extraction section for extracting color data from image data outputted by the output section; and
a color conversion information creation section for creating information representing a transformation relationship from a color coordinate system before the color conversion to a color coordinate system after the color conversion on the basis of the correspondence between the extracted color data and the arbitrarily set signals,
and wherein the black-coloring processing portion decomposes the first color signals into the second color signals and a black signal in accordance with $K=\alpha \times (\min(I))$ $A=g(I)-h(k_2)$ $B=i(I)-j(k_2)$ $I'=A \div B (A \neq B \text{ or } B \neq 0)$ where K is the black signal, I is the first color signals, I' is the second color signals, min(I) is the minimum among the first color signals, $\alpha$ is f(min(I)) or a constant, $k_2$ is the amount by which underlying color is removed (less than min(I)), g(I) is a function of I, $h(k_2)$ is a function of $k_2$, i(I) is a function of I, and $j(k_2)$ is a function of $k_2$.

7. The color image forming apparatus according to claim 6, wherein the black-coloring processing portion decomposes the first color image signals into the second color signals and the black signal so that the total of the amounts of color materials and the amount of black material used in the output section is not larger than a predetermined value.

8. A color image forming apparatus comprising:
a color signal switching section for, at normal operation time, selectively outputting signals supplied directly or indirectly from a color conversion section and, at color conversion table creation time, selectively outputting arbitrarily set signals to a first range correction section for compressing the signal range of input signals;
a black-coloring processing portion for performing a black-coloring process on the signals corrected by the first range correction section;
a second range correction section for expanding the signal range of the signals subjected to the black-coloring process by the black-coloring processing portion;
a color data extraction section for extracting color data from image data outputted by the output section; and
a color conversion information creation section for creating information representing a transformation relationship from a color coordinate system before the color conversion to a color coordinate system after the color conversion on the basis of the correspondence between the extracted color data and the arbitrarily set signals,
and wherein the black-coloring processing portion decomposes the first color signals into the second color signals and the black signal in accordance with $K=f(\min(I))$ $A=h(I)-j(g(\min(I)))$ $B=i(I)-k(g(\min(I))$ $I'=A \div B (A \neq B \text{ or } B \neq 0)$ where K is the black signal, I is the second color signals, I' is the third color signals, min(I) is the minimum among the second color signals, f(min(I)) is a function of min(I), g(min(I)) is a function of min(I), h(I) is a function of I, i(I) is a function of I, j(g(min(I))) is a function of g(min(I)), and k(g(min(I))) is a function of g(min(I)).

9. A color image forming apparatus comprising:
a black-coloring processing portion for decomposing first color image signals each corresponding to one of multiple colors into second color signals and a black signal;

an extraction section for extracting an image area to be output in black only in the color signals; I a black conversion section for converting color image signals for the image area to be output in black only into black signals; and an output section for outputting a color image corresponding to the second color signals and the black signals from the black conversion section, and wherein the black-coloring processing portion decomposes the first color image signals into second color image signals and the black signal so that the black signal is increased preferentially in achromatic high-density image portions, the color signals are increased in other image portions, and the total of the amounts of color materials and the amount of black material used in the output section is not larger than a predetermined value.

10. A color image forming apparatus comprising:

a color signal switching section for, at normal operation time, selectively outputting signals supplied directly or indirectly from a color conversion section and, at color conversion table creation time, selectively outputting arbitrarily set signals to a black-coloring processing portion;

an extraction section for extracting an image area to be output in black only in the color signals;

a black conversion section for converting color image signals for the image area to be output in black only into black signals; and an output section for outputting color signals and a black signal decomposed by the black-coloring processing portion as a color image;

a color data extraction section for extracting color data from image data outputted by the output section; and a color conversion information section for creating information representing a transformation relationship from a color coordinate system before the color conversion to a color coordinate system after the color conversion on the basis of the correspondence between the extracted color signals and the arbitrary set signals, and wherein the black-coloring processing portion decomposes the first color image signals into second color image signals and the black signal so that the black signal is increased preferentially in achromatic high-density image portions, the color signals are increased in other image portions, and the total of the amounts of color materials and the amount of black material used in the output section is not larger than a predetermined value.

11. A color image forming apparatus comprising:

black-coloring processing portion for decomposing first color image signals each corresponding to one of multiple colors into second color signals and a black signal, and output section for outputting the second color signals and the black signal as a color image using chromatic color materials and a black color material, wherein the black-coloring processing portion decomposes the first color image signals into the second color signals and the black signal so that the total of the amounts of color materials and the amount of black material used in the output section is not larger than a predetermined value.

12. The color image forming apparatus according to claim 11, wherein the black-coloring processing portion decomposes the first color image signals into the second color signals and the black signal so that the black signal is increased preferentially in achromatic high-density image portions, the color signals are increased in other image portions, and the total of the amounts of color materials and the amount of black material used in the output section is not larger than a predetermined value.

13. A color image forming apparatus comprising:

a black-coloring processing portion for decomposing first color image signals each corresponding to one of multiple colors into second color signals and a black signal, and an output section for outputting the second color signals and the black signal as a color image using chromatic color materials and a black color material, and wherein the black-coloring processing portion decomposes the first color signals into the second color signals and the black signal in accordance with $$K=f(\min(I))$$

$$A=h(I)-j(g(\min(I)))$$

$$B=i(I)-k(g(\min(I)))$$

$$I'=A \div B(A \neq B \text{ or } B \neq 0)$$

where K is the black signal, I is the first color signals, I' is the second color signals, $\min(I)$ is the minimum among the first color signals, $f(\min(I))$ is a function of $\min(I)$, $g(\min(I))$ is a function of $\min(I)$, $h(I)$ is a function of I, $i(I)$ is a function of I, $j(g(\min(I)))$ is a function of $g(\min(I))$, and $k(g(\min(I)))$ is a function of $g(\min(I))$, and wherein A corresponds to an arbitrary color of ink having a quantity of blackening amendment, B corresponds to an arbitrary color of ink having a quantity of blackening limitation, and I' corresponds to an arbitrary color of ink having an amended pigment.

\* \* \* \* \*